(12) United States Patent  
Guldenfels

(10) Patent No.: US 6,725,883 B2
(45) Date of Patent: Apr. 27, 2004

(54) FLAT TOP OPEN HINGE MODULE

(75) Inventor: Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 10/153,360

(22) Filed: May 22, 2002

(65) Prior Publication Data

US 2002/0179418 A1 Dec. 5, 2002

Related U.S. Application Data

(60) Provisional application No. 60/295,993, filed on Jun. 5, 2001.

(51) Int. Cl.$^7$ .............................................. B65G 17/06
(52) U.S. Cl. .................... 138/850; 198/851; 198/852; 198/853
(58) Field of Search ................ 198/850, 851, 198/852, 853

(56) References Cited

U.S. PATENT DOCUMENTS

| 1,282,326 | A | * | 10/1918 | Turnbull ................ 198/850 |
|---|---|---|---|---|
| 2,911,091 | A | | 11/1959 | Imse |
| 3,653,494 | A | | 4/1972 | Miller |
| 3,672,488 | A | | 6/1972 | Collins |
| 3,706,200 | A | | 12/1972 | Mueller |
| 3,774,752 | A | | 11/1973 | Harvey |
| 3,785,476 | A | | 1/1974 | Poerink |
| D231,633 | S | | 5/1974 | Totani |
| 3,868,011 | A | | 2/1975 | Janzen et al. |
| 3,871,510 | A | | 3/1975 | Homeier |
| 3,939,964 | A | | 2/1976 | Poerink |
| 4,074,518 | A | | 2/1978 | Taubert et al. |
| 4,078,654 | A | | 3/1978 | Sarovich |
| D270,201 | S | | 8/1983 | Hodlewsky et al. |
| D270,202 | S | | 8/1983 | Hodlewsky et al. |
| 4,429,785 | A | | 2/1984 | Dango |
| 4,436,200 | A | | 3/1984 | Hodlewsky et al. |
| 4,586,601 | A | | 5/1986 | Hodlewsky |
| 4,611,710 | A | | 9/1986 | Mitsufuji |
| 4,618,056 | A | | 10/1986 | Cutshall |
| 4,676,368 | A | | 6/1987 | Damkjär |
| D291,777 | S | | 9/1987 | Lapeyre et al. |
| 4,709,807 | A | | 12/1987 | Poerink |
| 4,903,824 | A | | 2/1990 | Takahashi |
| 4,909,380 | A | | 3/1990 | Hodlewsky |
| 4,951,457 | A | | 8/1990 | Deal |
| 4,958,726 | A | | 9/1990 | Fett et al. |

(List continued on next page.)

FOREIGN PATENT DOCUMENTS

| EP | 0 144 455 A1 | 6/1985 |
|---|---|---|
| EP | 0 355 080 A1 | 2/1990 |
| EP | 0 477 205 B1 | 4/1992 |
| EP | 0 621 851 B1 | 11/1994 |
| EP | 0 654 426 A1 | 11/1994 |
| WO | WO 90/15763 | 12/1990 |
| WO | WO 95/05986 | 3/1995 |

*Primary Examiner*—Douglas Hess
(74) *Attorney, Agent, or Firm*—Hodgson Russ LLP

(57) ABSTRACT

A module having a flat top construction with a planar deck extending to opposed link ends provided with pivot rod openings. The pivot rod openings are oval-shaped with the longitudinal axis of the oval aligned at a 45° angle with respect to and toward the planar surface of the deck. The link ends have a proximal, planar upper surface portion extending from the deck and forming into a distal, curved upper surface portion beginning at a position almost vertically aligned with the outer longitudinal extent of the oval pivot rod openings. The distal portion of the link ends has an inwardly angled, planar outer surface extending downwardly from the curved upper surface portion to a position substantially horizontally coplanar with a lower extent of the pivot rod openings and then to an inwardly curved surface leading to a planar bottom of the link ends. The inner portion of the link ends curves upwardly to a planar bottom surface of the deck. The deck has a concave surface between link ends which serves to receive a link end of a succeeding connected module.

24 Claims, 7 Drawing Sheets

U.S. PATENT DOCUMENTS

| | | | |
|---|---|---|---|
| 4,993,544 A | * 2/1991 | Bailey et al. | 198/853 |
| 5,020,656 A | * 6/1991 | Faulkner | 198/853 |
| 5,020,659 A | 6/1991 | Hodlewsky | |
| 5,027,944 A | 7/1991 | Damkjaer | |
| 5,040,670 A | 8/1991 | Mendoza | |
| 5,096,050 A | 3/1992 | Hodlewsky | |
| 5,123,524 A | * 6/1992 | Lapeyre | 198/853 |
| 5,125,504 A | 6/1992 | Corlett et al. | |
| 5,176,247 A | 1/1993 | Counter et al. | |
| 5,181,601 A | * 1/1993 | Palmaer et al. | 198/852 |
| 5,247,789 A | * 9/1993 | Abbestam et al. | 198/851 |
| 5,305,869 A | 4/1994 | Damkjaer | |
| 5,309,705 A | 5/1994 | Takahashi et al. | |
| 5,339,946 A | 8/1994 | Faulkner et al. | |
| 5,346,060 A | 9/1994 | Ferguson | |
| 5,361,893 A | 11/1994 | Lapeyre et al. | |
| 5,372,248 A | * 12/1994 | Horton | 198/852 |
| 5,425,443 A | 6/1995 | van Zijderveld et al. | |
| 5,435,435 A | 7/1995 | Chiba et al. | |
| 5,490,591 A | 2/1996 | Faulkner | |
| 5,507,383 A | 4/1996 | Lapyere et al. | |
| 5,586,643 A | 12/1996 | Zabron et al. | |
| 5,598,916 A | 2/1997 | Horton et al. | |
| 5,634,550 A | 6/1997 | Ensch et al. | |
| 5,697,492 A | 12/1997 | Damkjaer | |
| 5,706,934 A | 1/1998 | Palmaer et al. | |
| 5,775,480 A | * 7/1998 | Lapeyre et al. | 198/852 |
| 5,779,027 A | 7/1998 | Ensch et al. | |
| 5,826,705 A | * 10/1998 | Ramsey et al. | 198/853 |
| 5,850,905 A | 12/1998 | Foster | |
| 5,860,507 A | 1/1999 | Foster | |
| 5,904,241 A | 5/1999 | Verdigets et al. | |
| 5,954,190 A | 9/1999 | Takahashi et al. | |
| 5,988,363 A | 11/1999 | Takahashi et al. | |
| 5,996,776 A | 12/1999 | van Zijderveld | |
| D419,742 S | 1/2000 | Abbestam | |
| D420,483 S | 2/2000 | Abbestam | |
| 6,019,215 A | 2/2000 | Foster | |
| 6,330,941 B1 | * 12/2001 | Guldenfuls | 198/853 |
| 6,364,095 B1 | * 4/2002 | Layne et al. | 198/852 |
| 6,382,405 B1 | * 5/2002 | Palmaer | 198/850 |

* cited by examiner

FLAT TOP OPEN HINGE MODULE

CROSS-REFERENCE TO RELATED APPLICATION

Applicant hereby claims priority based on U.S. Provisional Application No. 60/295,993 filed Jun. 5, 2001, entitled "Flat Top Open Hinge Module for Easy Cleaning" which is incorporated herein by reference.

FIELD OF INVENTION

The present invention relates to conveyor belts, particularly plastic modular conveyor belts used primarily in the food industry.

BACKGROUND OF THE INVENTION

Because they do not corrode, are light weight, and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are then connected together to form an endless conveyor belt capable of articulating about a drive sprocket.

Solid or flat top modular plastic conveyor belts are often used in the food industry for meats, fish, or other products that drip or tend to drop crumbs or particles. Solid top belts typically have link ends of a shape that tapers in width from top to bottom, so that although the top of the belt can present a smooth, flat surface with very small gaps at the intercalated connection of the link ends, the link ends are spaced apart at the bottom of the belt, and gaps also open up when the belt travels around a sprocket, bending the pivot junctures. This provides the ability to clean the gaps between the link ends, which is particularly important in the food industry. Steam or hot water, which may include cleaning agents and disinfectants, can be used to clean the spaces between the link ends as the belt travels over a sprocket and changes direction. In some instances, cleaning occurs on the return portion of the belt from the reverse side. In each module, the link ends of at least one row are tapered for this purpose, with the top surface of each link end essentially being rectangular so as to fill in a rectangular gap formed by intercalated link ends of the next module. When the pivot junctures flex to an angular configuration, gaps open up between the link ends, exposing the connecting rod to some extent.

What is needed is a module design having a shape that causes the gaps between the links to change their shape when the modules pass over a sprocket yet also provides a link end geometry that is designed for optimal engagement with the teeth on the drive sprocket.

SUMMARY OF THE INVENTION

The present invention meets the above-described need by providing a module having a flat top construction with a planar deck extending to opposed link ends provided with pivot rod openings. The pivot rod openings are oval-shaped with the longitudinal axis of the oval aligned at a 45° angle with respect to and toward the planar surface of the deck. The link ends have a proximal, planar top surface extending from the deck and forming into a distal, curved portion beginning at a position almost vertically aligned with the outer longitudinal extent of the oval pivot rod openings. The distal portion of the link ends has an inwardly angled, planar outer surface extending downwardly from the curved upper surface portion to a position substantially horizontally coplanar with a lower extent of the pivot rod openings and then to an inwardly curved surface leading to a planar bottom of the link ends. The inner portion of the link ends curves upwardly to a planar bottom surface of the deck. The deck has a concave surface between link ends which serves to receive a link end of a succeeding connected module.

BRIEF DESCRIPTION OF THE DRAWINGS

The invention is illustrated in the drawings in which like reference characters designate the same or similar parts throughout the figures of which.

DETAILED DESCRIPTION

Figure 1:
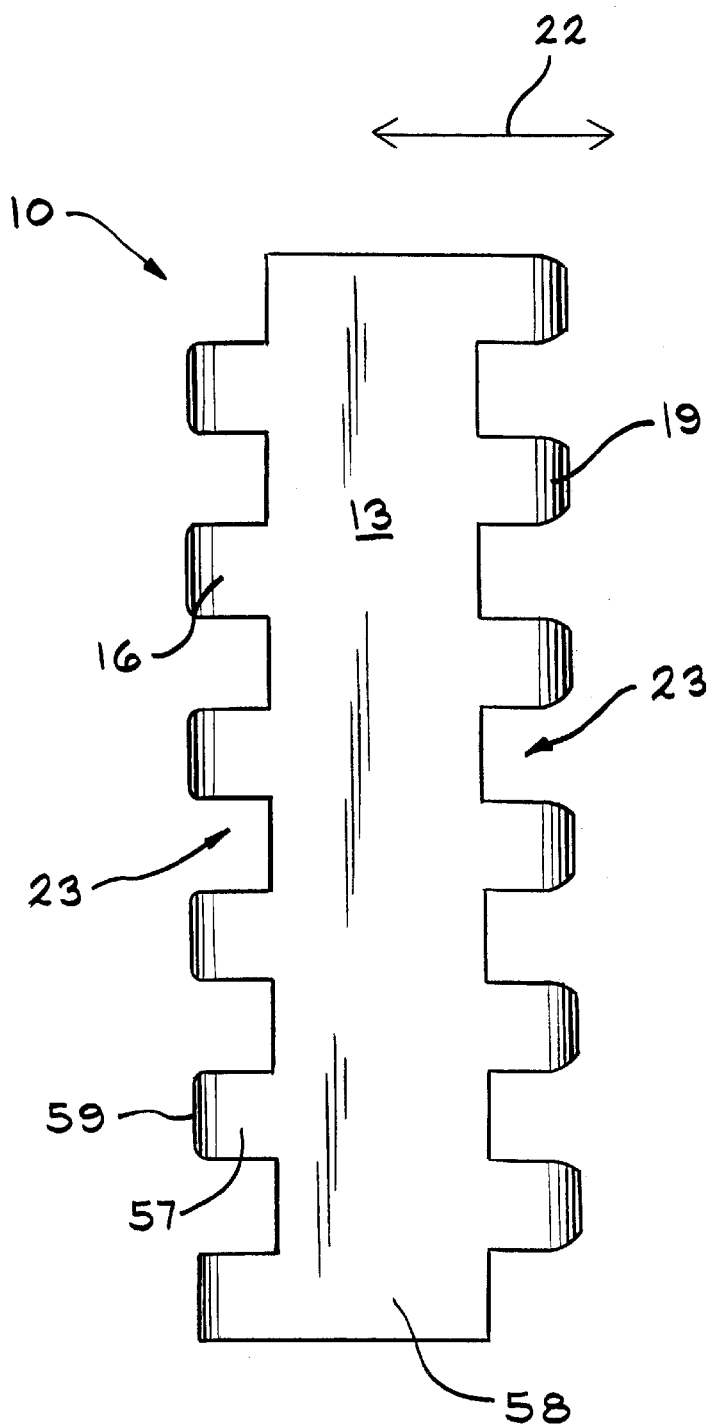
FIG. 1 is a top plan view of a belt module of the present invention.

Referring to FIGS. 1–7 and initially to FIG. 1, a belt module 10 of the present invention includes a planar deck 13 extending to opposed link ends 16, 19. The link ends 16, 19 are offset along an axis disposed transverse to the direction of belt travel indicated by arrow 22. The offset provides substantially rectangular openings 23 that receive link ends 16, 19 from an adjacent module 10. The configuration of the link ends 16, 19 provides for intercalating the link ends 16, 19 of adjacent modules such that the top of the belt can present a smooth, flat surface with very small gaps at the intercalated connection of the link ends.

Figure 2:
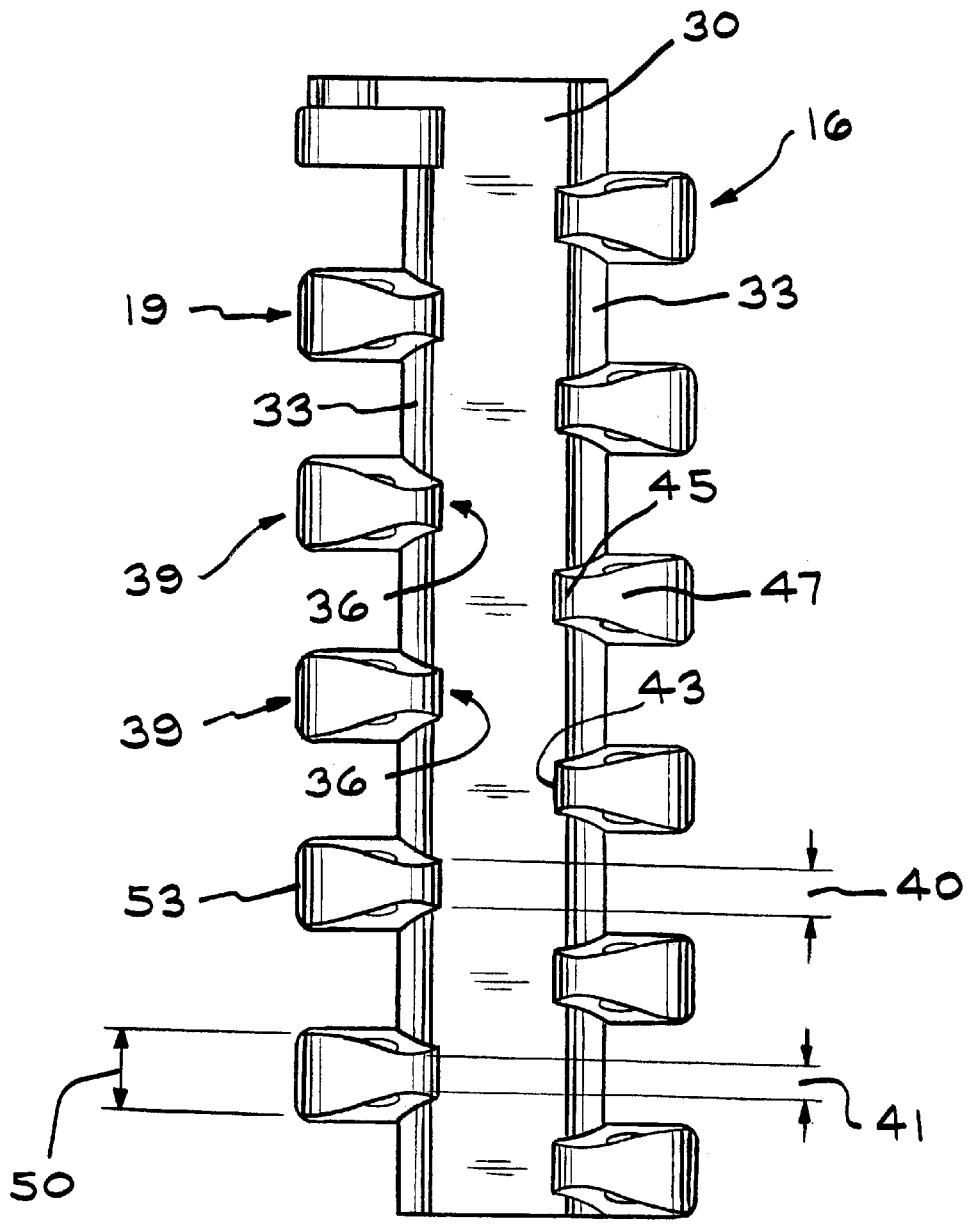
FIG. 2 is a bottom plan view of the module of FIG. 1.

In FIG. 2, the bottom of the module 10 is shown. The bottom surface 30 of the planar deck 13 is also planar and extends between link ends 16, 19. The deck 13 has a concave surface 33 between link ends 16, 19 that serves to receive a link end 16, 19 of an adjacent module 10.

Each link end 16, 19 has a first end 36 facing toward the deck 13 and a second end 39 facing in the opposite direction. The first end 36 curves away from the deck and tapers inwardly from a first width 40 near the deck to a second width 41. The first end 36 joins with the bottom surface 30 of the deck 13 by means of a curved end 43. A curved section 45 extends from the first end 36 to a planar bottom surface 47 of the link end. From the first end 36 to the second end 39 across the bottom surface 47 of the link ends 16, 19; the width increases from the narrower width 41 at the first end 36 to a larger width 50 at the second end 39. A side wall portion 52 (FIG. 3) of the first end 36 extends substantially perpendicular to the bottom surface 30. The planar bottom surface 47 of the link end 16, 19 extends to a curved portion 53 that merges with the second end 39 facing outward. The second end 39 has a substantially planar wall 54 that is disposed perpendicular to the bottom surface 30. The wall 54 extends to a portion 59 that curves downward and extends to the surface 57.

Figure 3:
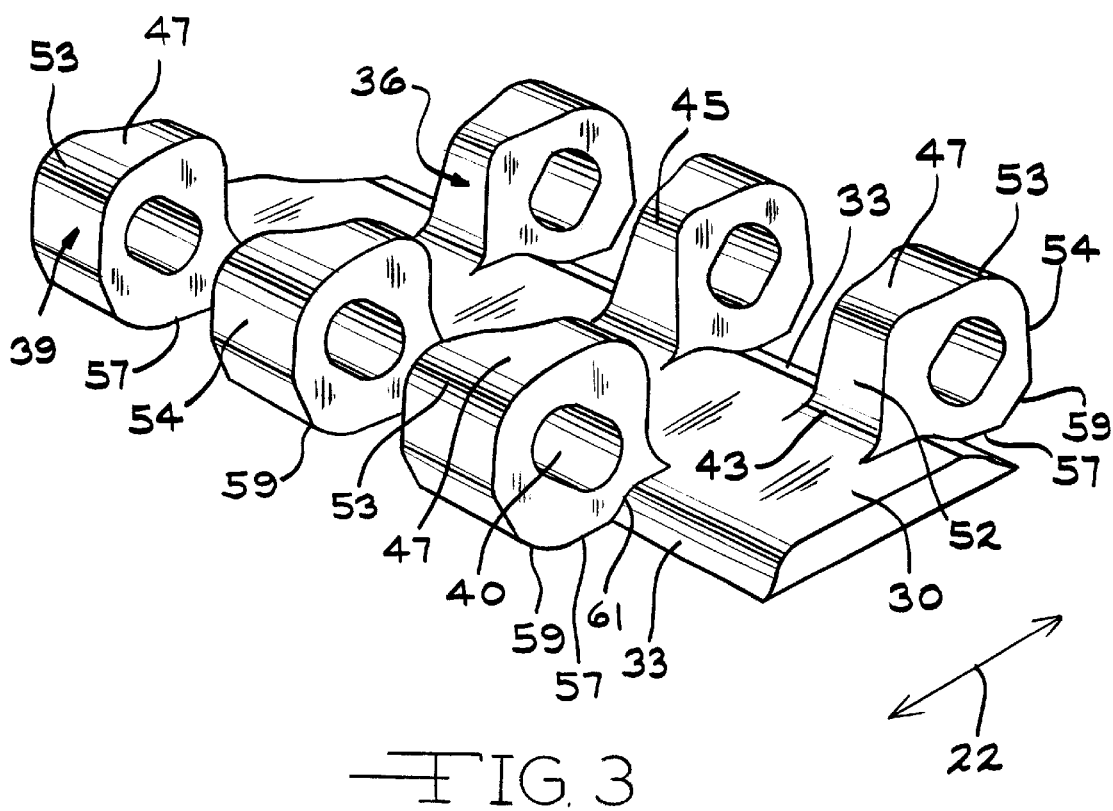
FIG. 3 is a partial bottom perspective view of the belt module.
Figure 6:
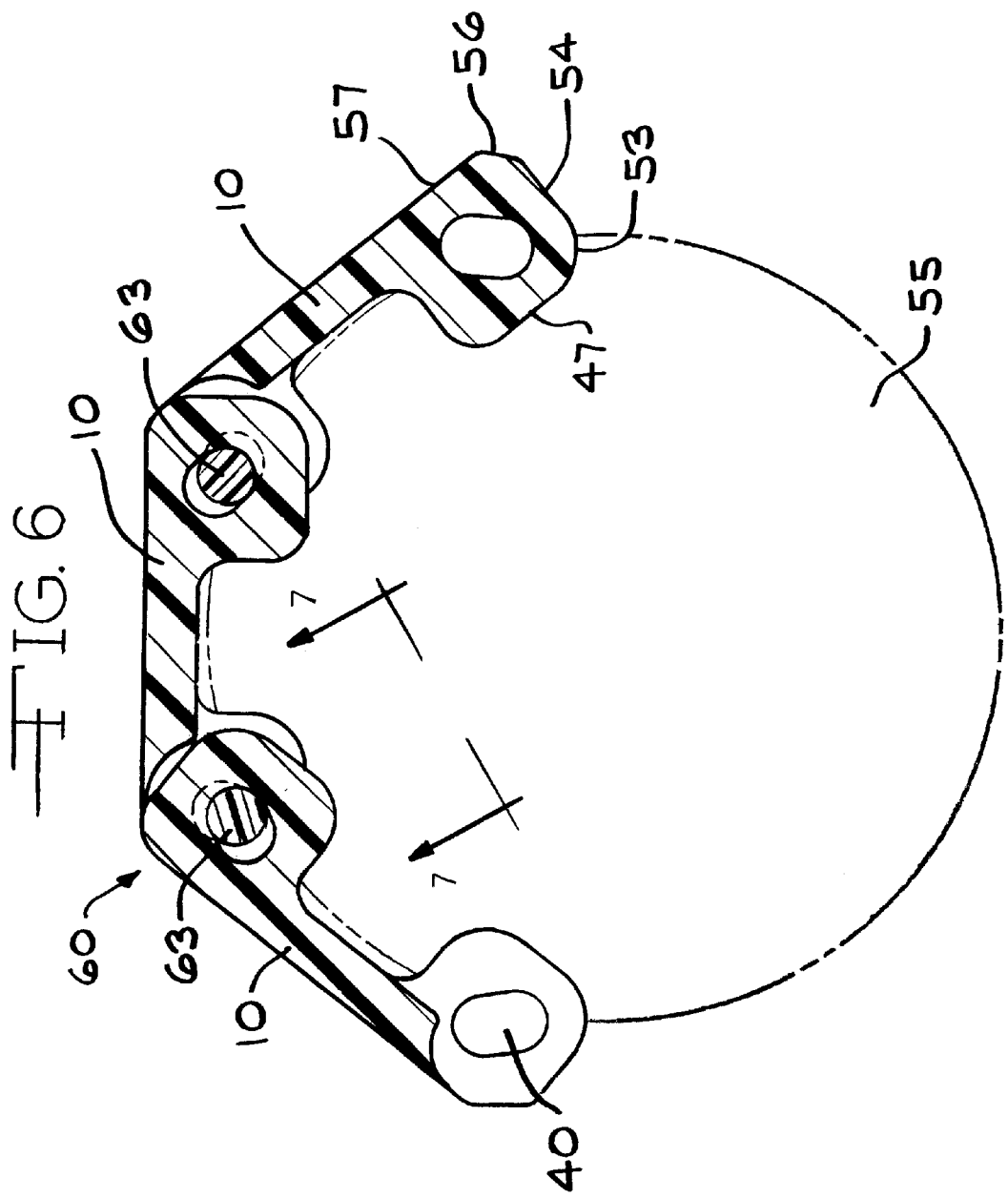
FIG. 6 is a cross-sectional side elevational view of the belt of the present invention as it passes over a sprocket; and, FIG. 7 is a view of the bottom of the belt taken along lines 7—7 of FIG. 6.

Turning to FIG. 3, the link ends 16, 19 have openings 40 that are disposed perpendicular to the direction of belt travel indicated by arrow 22. The openings 40 are oval-shaped and angled at approximately forty-five degrees with respect to the planar deck 13 as disclosed in copending U.S. patent application Ser. No. 09/583,053 which is assigned to the assignee of the present invention, the disclosure of which is incorporated by reference. As shown in FIG. 2, the second end 39 of the link ends 16, 19 that faces outward has a width 50 that is almost equal to the width of the entire link end 16, 19. Accordingly, the second end 39 provides a wide surface for engagement with the teeth (not shown) on the drive sprocket 55 (FIG. 6).

The link ends 16, 19 have a proximal, planar top surface 57 (FIG. 1) extending from top surface 58 (FIG. 1) of the deck 13 and forming into a distal, curved top surface portion 59 (FIG. 1) beginning at a position almost vertically aligned with the outer longitudinal extent of the oval pivot rod openings 40. The distal portion of the link ends 16, 19 extends to the planar outer surface 39 extending downwardly from the curved upper surface portion 59 to a position substantially horizontally coplanar with a lower extent of the pivot rod openings 40 and then to the portion 54 and inwardly curved surface 53 leading to the planar bottom surface 47 of the link ends 16, 19.

An inner portion 61 of the link ends 16, 19 curves upwardly to the planar bottom surface 30 of the deck 13.

Figure 4:
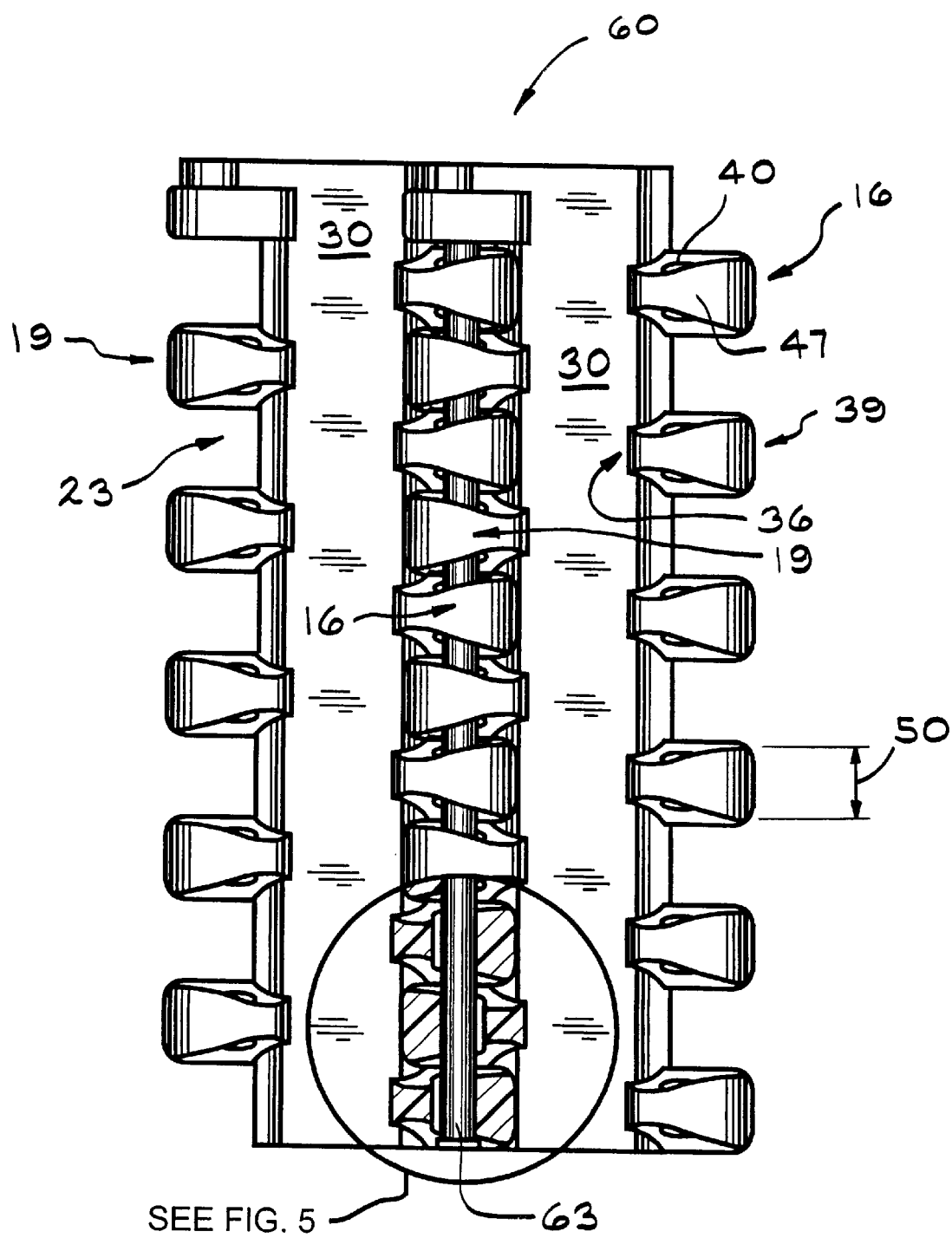
FIG. 4 is a bottom plan view of the modular belt of the present invention.

In FIG. 4, the underside of a modular belt 60 containing the belt modules 10 of the present invention is shown. A pivot rod 63 extends through the alternating link ends 16, 19 of adjacent modules 10. The belt 60 is shown in the form that it takes when the belt 60 is moving along a straight section of the conveying path. At this position, the top surface of the belt presents a smooth flat surface with very little if any open space between the adjoining modules 10. As shown, the link ends 16, 19 are tapered from the second end 39 to the first end 36 such that the link ends 16, 19 provide openings for cleaning yet maintain almost a full width at the second end 39 for engaging with the teeth of the drive sprocket 55.

Figure 5:
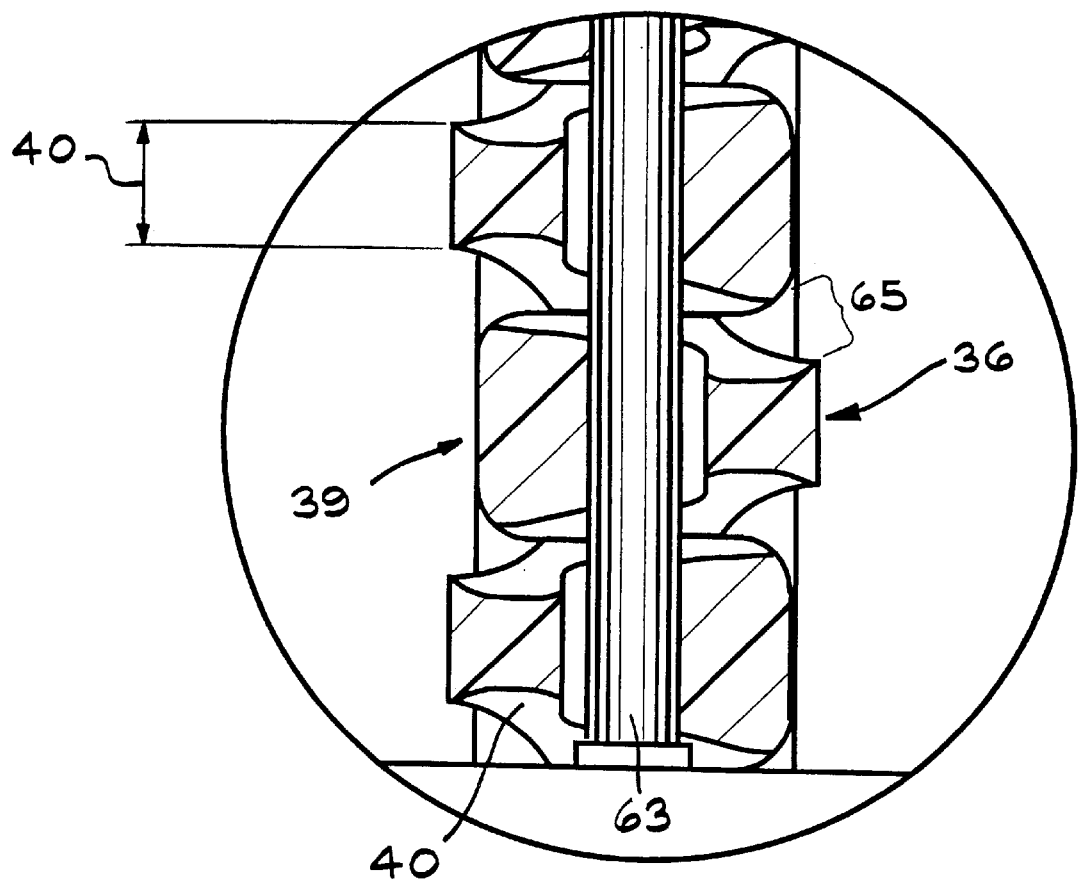
FIG. 5 is a detailed bottom plan view of a section of the belt shown in FIG. 4.

Turning to FIG. 5, a detailed cross-section of the bottom of the belt 60 is shown. The tapering of the first end 36 of the link ends 16, 19 provides openings 65 around the pivot rods 63 between the link ends 16, 19. Although the pivot rod 63 is exposed, there is very little if any opening through the top surface of the belt 60.

Figure 7:
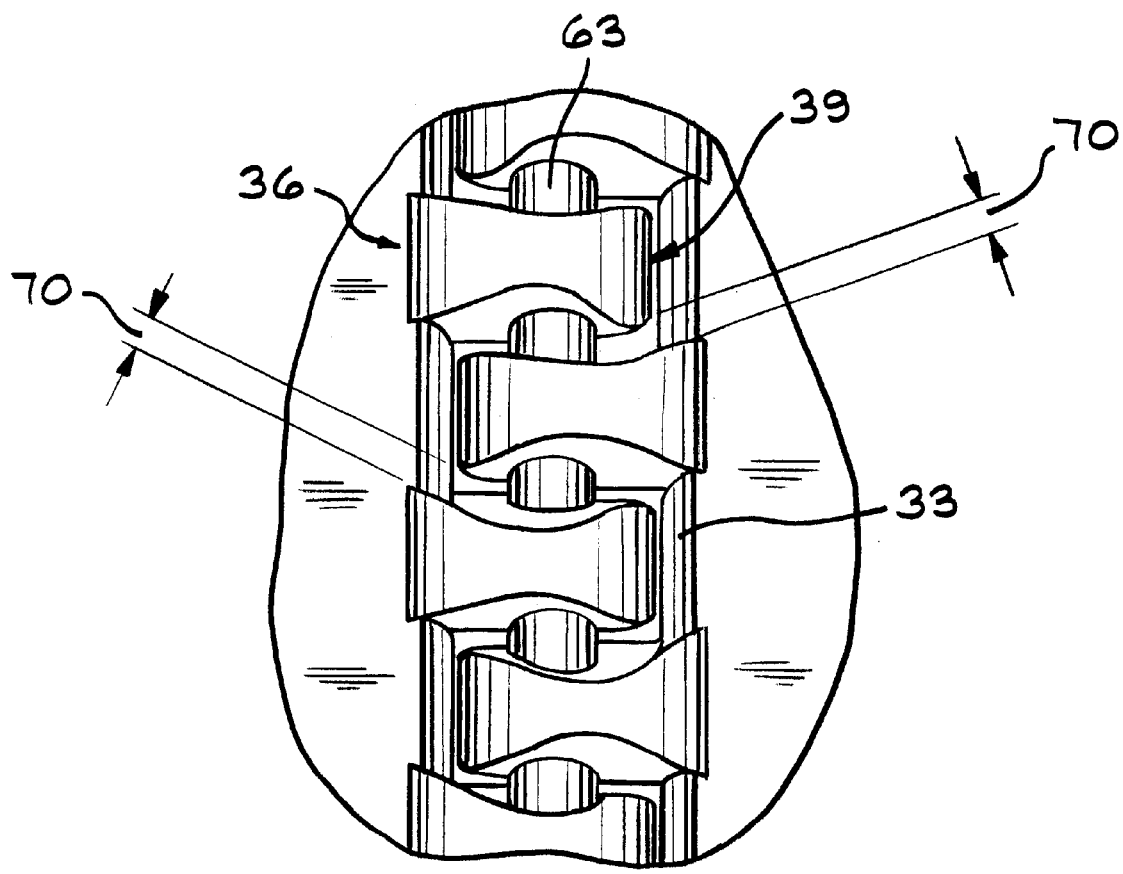

In FIGS. 6–7, the belt 60 is shown as it passes over the drive sprocket 55. As best shown in FIG. 7, when the belt modules 10 flex to an angular configuration, gaps 70 open up between the link ends 16, 19, increasing the exposure of the connecting rod 63. Because the gap between the links gets larger, pinched residual food matter will be released in this position.

Accordingly, the present invention provides a module design having a shape that causes the gaps between the links to change their shape when the modules 10 pass over a sprocket 55 yet also provides a link end geometry that is designed for optimal engagement with the teeth on the drive sprocket 55.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module, comprising:

a planar deck having opposed end walls, opposed side walls, a top surface and a bottom surface, the planar deck having a substantially rectangular shape;

a first plurality of link ends extending from the planar deck in a direction of belt travel; and, a second plurality of link ends extending from the planar deck in a direction opposite to the first link ends, the second link ends being offset from the first link ends such that adjacently positioned belt modules are capable of intercalating so that the first link ends of one belt module fit into spaces defined between the second link ends of an adjacent module;

wherein the first and second link ends have a top surface that is substantially coplanar with the top surface of the planar deck, the top surface of the first and second link ends having a first width, the first and second link ends having a first end and a second end connected by a planar bottom surface that is disposed substantially parallel to the deck, the first end of the bottom surface having a width that is less than the width of the second end of the bottom surface, the top surface of the first and second link ends having a larger width than the bottom surface of the first and second link ends, the first and second link ends having openings defined therein, the openings disposed substantially perpendicular to the direction of belt travel.

2. The belt module of claim 1, wherein the bottom surface of the link ends is tapered between the first end and the second end.

3. The belt module of claim 1, wherein the top surface of the deck forms into a distal curved portion beginning at a position in substantial vertical alignment with an outer longitudinal extent of the pivot rod opening.

4. The belt module of claim 1, wherein the distal portion of the link ends has a planar outer surface extending substantially downward from a curved top surface portion to a position horizontally coplanar with a lower extent of the pivot rod openings.

5. The belt module of claim 4, wherein the planar outer surface is substantially perpendicular to the deck.

6. The belt module of claim 4, wherein the planar outer surface is angled inward toward the deck.

7. The belt module of claim 1, wherein the deck has a concave surface disposed between the link ends.

8. The belt module of claim 1, wherein the first end of the link end has a side wall disposed substantially perpendicular to the deck, the side wall extending to the deck, the side wall having a first portion with a width that is less than the width of a second portion adjacent the deck, the bottom surface of the link ends being tapered between the first end and second end from a narrower portion at the first end to a wider portion at the second end.

9. A modular belt, comprising:

a plurality of belt modules having a planar deck having opposed end walls, opposed side walls, a top surface and a bottom surface, the planar deck having a substantially rectangular shape; a first plurality of link ends extending from the planar deck in a direction of belt travel; and, a second plurality of link ends extending from the planar deck in a direction opposite to the first link ends, the second link ends being offset from the first link ends such that adjacently positioned belt modules are capable of intercalating so that the first link ends of one belt module fit into spaces defined between the second link ends of an adjacent module; wherein the first and second link ends have a top surface that is substantially coplanar with the top surface of the planar deck, the top surface of the first and second link ends having a first width, the first and second link ends having a first end and a second end connected by a planar bottom surface that is disposed substantially parallel to the deck, the first end of the bottom surface having a width that is less than the width of the second end of the bottom surface, the top surface of the first and second link ends having a larger width than the bottom surface of the first and second link ends, the first and second link ends having openings defined therein, the openings disposed substantially perpendicular to the direction of belt travel; and, a plurality of pivot rods disposed through the first and second pivot rod openings such that the belt modules are intercalated and the adjacent belt modules are interlinked into adjacent hinged rows.

10. The belt module of claim 9, wherein the bottom surface of the link ends is tapered between the first end and the second end.

11. The belt module of claim 9, wherein the first end of the link end has a side wall disposed substantially perpendicular to the deck, the side wall extending to the deck, the side wall having a first portion with a width that is less than the width of a second portion adjacent the deck, the bottom surface of the link ends being tapered between the first end and second end from a narrower portion at the first end to a wider portion at the second end.

12. The belt module of claim 9, wherein the top surface of the deck forms into a distal curved portion beginning at a position in substantial vertical alignment with an outer longitudinal extent of the pivot rod opening.

13. The belt module of claim 9, wherein the distal portion of the link ends has a planar outer surface extending substantially downward from a curved top surface portion to a position horizontally coplanar with a lower extent of the pivot rod openings.

14. The belt module of claim 13, wherein the planar outer surface is substantially perpendicular to the deck.

15. The belt module of claim 13, wherein the planar outer surface is angled inward toward the deck.

16. The belt module of claim 9, wherein the deck has a concave surface disposed between the link ends.

17. A method of configuring a modular belt, comprising:
providing a plurality of belt modules having a planar deck having opposed end walls, opposed side walls, a top surface and a bottom surface, the planar deck having a substantially rectangular shape; a first plurality of link ends extending from the planar deck in a direction of belt travel; and, a second plurality of link ends extending from the planar deck in a direction opposite to the first link ends, the second link ends being offset from the first link ends such that adjacently positioned belt modules are capable of intercalating so that the first link ends of one belt module fit into spaces defined between the second link ends of an adjacent module; wherein the first and second link ends have a top surface that is substantially coplanar with the top surface of the planar deck, the top surface of the first and second link ends having a first width, the first and second link ends having a first end and a second end connected by a planar bottom surface that is disposed substantially parallel to the deck, the first end of the bottom surface having a width that is less than the width of the second end of the bottom surface, the top surface of the first and second link ends having a larger width than the bottom surface of the first and second link ends, the first and second link ends having openings defined therein, the openings disposed substantially perpendicular to the direction of belt travel, and a plurality of pivot rods disposed through the first and second pivot rod openings such that the belt modules are intercalated and the adjacent belt modules are interlinked into adjacent hinged rows; and, placing pivot rods through the first and second pivot rod openings in adjacent belt modules such that the first and second link ends of the adjacent belt modules are intercalated and the adjacent belt modules are interlinked into adjacent hinged rows to form an endless belt capable of articulating about a drive sprocket.

18. The method of claim 17, wherein the bottom surface of the link ends is tapered between the first end and the second end.

19. The method of claim 17, wherein the first end of the link end has a side wall disposed substantially perpendicular to the deck, the side wall extending to the deck, the side wall having a top portion with a width that is less than the width of a bottom portion adjacent the deck, the bottom surface of the link ends being tapered between the first end and second end from a narrower top portion at the first end to a wider top portion at the second end.

20. The method of claim 17, wherein the top surface of the deck forms into a distal curved portion beginning at a position in substantial vertical alignment with an outer longitudinal extent of the pivot rod opening.

21. The method of claim 17, wherein the distal portion of the link ends has a planar outer surface extending substantially downward from a curved top surface portion to a position horizontally coplanar with a lower extent of the pivot rod openings.

22. The method of claim 21, wherein the planar outer surface is substantially perpendicular to the deck.

23. The method of claim 21, wherein the planar outer surface is angled inward toward the deck.

24. The method of claim 17, wherein the deck has a concave surface disposed between the link ends.

* * * * *